United States Patent
Pfaffelhuber

(10) Patent No.: US 10,500,809 B2
(45) Date of Patent: Dec. 10, 2019

(54) THERMALLY INSULATING PLANAR COMPONENT WITH LOW STRUCTURAL THICKNESS, IN PARTICULAR FOR LINING THE FUNCTIONAL SPACES OF A MOTOR VEHICLE

(71) Applicant: Röchling Automotive SE & Co. KG, Mannheim (DE)

(72) Inventor: Klaus Pfaffelhuber, Augsburg (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 35 days.

(21) Appl. No.: 15/813,744

(22) Filed: Nov. 15, 2017

(65) Prior Publication Data
US 2018/0141301 A1    May 24, 2018

(30) Foreign Application Priority Data

Nov. 22, 2016   (DE) .......................... 10 2016 223 057

(51) Int. Cl.
*F16L 59/065* (2006.01)
*B32B 3/06* (2006.01)
(Continued)

(52) U.S. Cl.
CPC .................. *B32B 3/06* (2013.01); *B32B 5/16* (2013.01); *B32B 7/05* (2019.01); *B32B 15/16* (2013.01);
(Continued)

(58) Field of Classification Search
CPC .... Y10T 428/231; F16L 59/065; E04B 1/803; F25D 2201/14; Y02B 80/12
See application file for complete search history.

(56) References Cited

U.S. PATENT DOCUMENTS

2014/0216100 A1 *  8/2014  Toshimitsu ........... F16L 59/065
                                                            62/440

FOREIGN PATENT DOCUMENTS

DE          19840990 C1    9/1999
EP           2980467 A1 *  2/2016  ............ F16L 59/026

OTHER PUBLICATIONS

German Search Report for corresponding DE 10 2016 223 057.3 dated Dec. 21, 2018, 7 pgs.
(Continued)

*Primary Examiner* — Alexander S Thomas
(74) *Attorney, Agent, or Firm* — Rankin, Hill & Clark LLP

(57) ABSTRACT

A thermally insulating planar component that extends in an extension plane and has a structural thickness orthogonal to the extension plane, the dimensions of the component in the extension plane being many times greater than its thickness measurement orthogonal to the extension plane, the component comprising a vacuum panel having an air-tight, evacuated metal foil envelope that is filled with highly dispersed ceramic powder, the metal foil envelope having two planar envelope walls arranged spaced from one another in the thickness direction and connected to one another by an edge region that spans the distance between the planar envelope walls in the thickness direction, each planar envelope wall having an inner surface that faces the other planar envelope wall and the highly dispersed ceramic powder and an outer surface that faces away from the other planar envelope wall and the highly dispersed ceramic powder is refined such that at least one of the planar envelope walls is designed in at least one deformation section as having a surface structure that increases the surface area of the planar envelope wall over that of a smooth surface structure, the component being curved about at least one curvature axis in the area of the deformation section such that the planar
(Continued)

envelope wall is convex on its outer surface in the deformation section.

18 Claims, 2 Drawing Sheets

(51) Int. Cl.
    *B32B 5/16*          (2006.01)
    *B60R 13/08*        (2006.01)
    *B32B 15/16*       (2006.01)
    *B32B 7/05*         (2019.01)
    *E04B 1/80*         (2006.01)

(52) U.S. Cl.
    CPC .... *B60R 13/0838* (2013.01); *B32B 2264/107* (2013.01); *B32B 2307/304* (2013.01); *B32B 2605/00* (2013.01); *E04B 1/803* (2013.01); *F16L 59/065* (2013.01); *F25D 2201/14* (2013.01); *Y10T 428/231* (2015.01)

(56) References Cited

OTHER PUBLICATIONS

Espacenet Bibliographic data:DE 19840990(C1), Published Sep. 30, 1999, 1pg.

* cited by examiner

THERMALLY INSULATING PLANAR COMPONENT WITH LOW STRUCTURAL THICKNESS, IN PARTICULAR FOR LINING THE FUNCTIONAL SPACES OF A MOTOR VEHICLE

The present invention relates to a thermally insulating planar component that extends within an extension plane and has a structural thickness orthogonally to the extension plane, the measurement of the component in the extension plane being many times greater than its thickness orthogonally to the extension plane; the component comprises a vacuum panel having an evacuated, air-tight metal foil envelope that is filled with highly dispersed ceramic powder, the metal foil envelope including two planar envelope walls that are arranged spaced from one another in the thickness direction and are connected to one another by an edge region that spans the distance between the planar envelope walls in the thickness direction, each planar envelope wall having an inner surface that faces the other planar envelope wall and the highly dispersed ceramic powder, and an outer surface that faces away from the other planar envelope wall and the highly dispersed ceramic powder.

BACKGROUND OF THE INVENTION

A thermally insulating planar component of this type is known commercially as a "vacuum insulation panel", or "VIP" for short. VIPs are typically used as flat insulating panels in refrigerators or as flat thermal insulation panels for insulating buildings in the construction industry.

Vacuum panels that have highly dispersed ceramic powder enclosed inside an evacuated metal foil envelope enable extremely low thermal conductivity values or heat transfer coefficients with a low structural thickness of only a few millimeters, on the one hand because the metal envelope, which is actually an effective heat conductor, is designed with a very narrow wall thickness of less than 150 µm, and on the other hand because the highly dispersed ceramic powder held between the two planar envelope walls has a very high thermal conductivity resistance or a very low thermal conductivity value, or a very low heat transfer coefficient. This is due, on the one hand, to the inherently low thermal conductivity of ceramic and, on the other hand, to its provision in the form of a highly dispersed powder within an evacuated environment, so that the already inherently low thermal conductivity of ceramic material is further reduced by the conduction of heat beyond particle boundaries, which increases thermal resistance, and by the vacuum conditions present in the spaces between the particles.

"Vacuum" naturally does not refer here to an absolute vacuum, which is not technically feasible in any case, but rather to a gas-poor evacuated state, such as can be produced using prior art means for producing vacuum panels or vacuum insulation panels, in a manner known per se.

VIPs are typically offered in the form of flat panels because this flat panel form is particularly easy and safe to produce. VIPs typically cannot be reshaped into three-dimensionally deformed bodies, since such reshaping would subject at least some areas of the smooth planar envelope walls to intense tensile elongation, usually causing the planar envelope walls made of thin metal foil to crack, even at low degrees of deformation. Even the slightest penetrations or disruptions in the integrity of the planar envelope wall will result in failure of the VIP as a thermally insulating component, first because penetration will destroy the vacuum inside the metal foil envelope, and second because ceramic powder can leak out of the metal foil envelope through the opening produced in the planar envelope wall. The metal foil of the metal foil envelope may be part of a laminate, which may comprise one or more plastic layers in addition to the metal foil. The metal foil may be covered on both sides by at least one plastic film, for the purpose of protection.

The demand for planar thermal insulation components in three-dimensional shapes is increasing in the field of automotive engineering for the purpose of thermally insulating functional spaces in the motor vehicle, such as the engine compartment. Insulating the engine compartment allows the internal combustion engine to cool down more slowly following an operating phase than without insulation, and if it is restarted during a cool-down phase, insulation enables it to heat more quickly to its nominal operating temperature, at which its pollutant emissions correspond to their respective nominal values, which are considerably lower than in a transient cold-start condition.

Planar LWRT components, i.e. porous, compacted thermoplastically bonded fiber material that can be readily reshaped from a fiber mat semifinished product into three-dimensional molded components in press molds with the application of heat, are used for lining engine compartments or more generally for lining functional spaces in motor vehicles.

However, components made from LWRT are beginning to reach their technical limits with the increasing requirements of recent developments in motor vehicles: Varying localized degrees of compaction in the LWRT material result in varying localized thermal conductivity values in the LWRT material in its thickness direction, and thus in varying localized degrees of insulating efficacy. With the increasingly limited space available for accommodating insulating lining components, at least locally higher degrees of compaction of LWRT components are unavoidable in those areas in which very limited space is available at the installation site in the motor vehicle. Other locations where more space is available for accommodating the LWRT material of lining components may be less compacted.

As the compaction of LWRT material increases, its efficacy as a thermal insulator decreases. This is presumably due to the decreasing porosity associated with increasing compaction and to the decreasing thickness of the component—which in this case is desirable.

SUMMARY OF THE INVENTION

It is therefore an object of the present invention to provide a thermally insulating planar component that, when shaped into a three-dimensional component, will provide high thermal insulation efficacy with low structural thickness. The thermally insulating planar component of the present invention should have higher heat transfer resistance in the thickness direction, in particular with the same structural thickness as an LWRT component, or should have a lower structural thickness than an LWRT component with the same heat transfer resistance in the thickness direction.

For the purposes of the present application, a "planar" component is one in which the dimensions of its extension plane are substantially greater than its thickness measurement orthogonally to its extension plane, i.e. one in which the dimensions of each of two mutually linearly independent planar extension directions that span the extension plane locally are at least ten times greater, for example, than the measurement in the thickness direction, orthogonally to each of the planar extension directions.

The planar component is considered to be three-dimensionally shaped if it is curved about at least one curvature axis. Preferably, it is curved about more than one curvature axis in order to achieve complex component shapes.

This object and others is achieved by the present invention with a thermally insulating planar component of the type in question, in which at least one of the planar envelope walls is designed as having a surface structure that increases the surface area of the planar envelope wall over that of a smooth surface structure in at least one deformation section, the planar component being curved in the region of the deformation section about at least one curvature axis such that the planar envelope wall is convexly curved on its outer surface in the deformation section.

Heretofore, it has been considered nearly impossible to deform vacuum panels of the aforementioned type, i.e. those made from a metal foil envelope filled with highly dispersed ceramic powder in an evacuated atmosphere, into three-dimensional shapes due to the resulting tensile stresses that would occur in the metal foil of the planar envelope walls. However, the inventors have demonstrated that altering the surface structure of at least one planar envelope wall will make reshaping a vacuum panel or vacuum insulation panel possible. For this purpose, at least the planar envelope wall that will be subjected to tensile stress during reshaping is formed with the surface area-increasing structure.

VIP-containing semifinished products have been successfully reshaped into three-dimensional components, for example, by forming foil hinges between those areas of the semifinished products that are filled with highly dispersed powder. In contrast to the areas of the semifinished product that are filled with highly dispersed powder, in the area of the foil hinges the semifinished products are formed solely by the at least one metal foil or by at least one laminate containing said metal foil. Thus, the powder-free component regions that are formed by foil hinges have very different thermal properties, more specifically thermal insulation properties, from the substantially planar regions that are filled with highly dispersed powder.

In contrast to the above, in the thermally insulating planar component of the present invention, highly dispersed ceramic powder can also be provided between the curved planar envelope wall sections in areas that are tightly curved by reshaping. The structural thickness of the thermally insulating planar component of the invention is preferably substantially independent of the component's curvature.

In the deformation section, the surface structure that increases the surface area of the envelope surfaces as compared with a smooth surface structure creates a deformation reserve, which can be stretched during reshaping without the resulting tensile stress in the planar envelope wall in question exceeding the permissible failure limit. During reshaping of the deformation section, the structure that increases the surface area is stretched and thereby smoothed out by the tensile stress that is exerted on the deformation section, without the possibility of failure of the planar envelope wall. Tensile stresses that occur during bending occur primarily on the planar envelope wall regions that are convexly curved after reshaping—as viewed from the outside.

A surface structure that increases the surface area can be obtained, for example, in that the at least one deformation section of each planar envelope wall, instead of having a smooth surface structure, has indentations extending toward the other planar envelope wall and/or protrusions extending away from the other planar envelope wall. When the planar envelope wall in question is viewed in cross-section in the thickness direction, the deformation section therefore preferably has a wavelike contour in the sectional plane, i.e. a contour with varying curvatures along its profile.

Prior to deformation, i.e. when the vacuum panel is in the form of a flat planar panel, the surface area-increasing surface structure of the deformation section is preferably configured as uniform in the deformation section. The deformation, i.e. the bending of the component about a bending axis, destroys this uniformity of the surface structure in the flat planar state due to the tensile and compressive bending stresses that occur, and the amplitude of the wavelike contour of the planar envelope wall being subjected to tensile stresses decreases as the bending radius decreases, i.e. as the curvature of the planar envelope wall increases. This is best illustrated by a cross-section through a sectional plane extending orthogonally to the bending axis or curvature axis.

With the present invention, the inventors have eliminated a preconception widely held among professionals in the field. The perception has always been, specifically, that vacuum panels could be produced only with smooth planar envelope walls, since otherwise the metal foil envelope could not be evacuated sufficiently. It was discovered, however, that by increasing the pressure acting on the metal foil envelope orthogonally to the planar envelope walls during evacuation, the metal foil envelope filled with highly dispersed ceramic powder can be evacuated sufficiently even if the structure of the planar envelope walls deviates at least in localized areas from a smooth surface. That made it possible, first of all, to construct vacuum panels with planar envelope walls that have a surface structure that increases the surface area of the planar envelope wall at least in localized areas of a deformation section, and that, despite the surface structure, have the low thermal conductivity values in the thickness direction that are typical of vacuum panels.

Second, these vacuum panels could be deformed in the region of their deformation sections from their original flat planar state, without risk of damage to the component or loss of function.

Thermally insulating planar components can therefore be produced in three-dimensional component shapes, with a substantially lower structural thickness than known LWRT components, but with the same thermal conductivity value in the thickness direction of the component. The structural thickness of the planar component with a vacuum panel according to the invention has only about half the structural thickness of an LWRT component, or even less, but has the same thermal conductivity in the thickness direction of the component.

One advantage of the component of the invention discussed herein is that it can be reshaped, starting with a flat planar vacuum panel semifinished product, into a three-dimensional form by press molding, rather than being produced in the required shape from the outset.

Depending on the degree of shaping, it may sufficient for only one of the planar envelope walls to be provided with a deformation section. In cases involving more complex shaping around multiple curvature axes and/or higher degrees of reshaping, it is advantageous for each of the two planar envelope walls to have at least one deformation section with a surface structure that increases the surface area of the planar envelope wall as compared with a smooth surface structure.

It may also suffice for the deformation section to be provided only in localized areas, while other sections of the planar envelope wall adjoining the deformation section are smooth.

To obtain a vacuum panel semifinished product that can ideally be formed without consideration of boundary conditions, the entire planar envelope wall, particularly preferably both planar envelope walls, of the metal foil envelope are preferably designed as having the surface area-increasing surface structure.

A planar envelope wall, or a portion thereof, is considered "smooth" if, for the entire portion, the planar envelope wall as viewed in two mutually orthogonal sectional planes, each extending in the component thickness direction, has a rectilinear section line or a section line that has the same curvature over its entire length.

Since bending around a bending axis, which results in a curvature of the planar envelope wall about an curvature axis, subjects the two planar envelope walls that surround the component bending axis to forces and/or stresses, if both the first planar envelope wall and the second planar envelope wall are equipped with a deformation section it is advantageous for the deformation section of one planar envelope wall and the deformation section of the other planar envelope wall to at least partially face one another in the thickness direction.

The above-mentioned indentations and/or protrusions of the surface area-increasing surface structure of the planar envelope wall that contains the deformation section are preferably arranged in a regular pattern. This not only facilitates the production of the planar envelope wall with its deformation section, but also leads to a nearly direction-independent deformability of the deformation section. For example, the planar envelope wall may be embossed in the deformation section, i.e. with spherical cup-shaped indentations and protrusions that alternate with one another in two mutually orthogonal planar directions of the extension plane. This is intended merely as an example. The protrusions and/or indentations do not necessarily have to be in the form of spherical cups. They may also be conical, frustoconical, or generally polyhedral or in the form of a truncated polyhedron, to name just a few alternatives.

In principle, it may be sufficient for the thermally insulating planar component of the present invention to be made from only one vacuum panel configured as described above. In that case, however, it may be necessary for the metal foils that form the metal foil envelope to be designed with a greater metal foil thickness, for example a metal foil thickness greater than 150 μm or even greater than 200 μm, to give the planar envelope walls the necessary strength, and to give the component as a whole sufficient dimensional stability. One example of a preferred metal foil is aluminum foil. With thicker metal foils, however, the ability of the component to conduct heat along the metal foil envelope from one side of the component to the other increases.

An advantageous refinement of the present invention therefore provides for at least one layer containing plastic to be provided on the outer surface of at least one planar envelope wall. Owing to its plastic content, the plastic-containing layer can be applied to the outer surface in a simple manner and reshaped along with the planar envelope wall. This plastic-containing layer can serve at least one of two purposes: It can protect the underlying planar envelope wall from external influences and/or it can give the component rigidity and/or dimensional stability. The metal foil of the envelope can then be designed as thinner, for example with a thickness of less than 100 μm or even less than 10 μm, owing to the rigidity that is added by the plastic-containing layer to the rigidity of the component.

The at least one plastic-containing layer can be extruded or adhesively bonded to the outer surface of the planar envelope wall, depending on the shape of the layer, if necessary with an adhesion promoter therebetween.

According to a first aspect of this advantageous refinement, the plastic-containing layer can comprise or can be a porous layer of thermoplastically bonded fiber material. The fiber material may comprise mineral fibers, in particular glass fibers, natural fibers and/or plastic fibers that melt only at higher temperatures than the thermoplastic binder, as is known with outer layers of LWRT materials. The thermoplastic binder material is preferably a polyolefin, in particular polypropylene. An adhesion promoter, which is applied to the outer surface of the planar envelope wall that includes the at least one plastic-containing layer, can therefore contain a material which is compatible with or identical to the thermoplastic binder material of the plastic-containing layer, in order to bond the plastic-containing layer to the outer surface of the planar envelope wall. The fiber material is preferably a tangled fiber material.

In addition, or alternatively, the plastic-containing layer may comprise or may be a solid plastic layer, also made of polypropylene or generally of a polyolefin, for example.

Also in addition or alternatively, the plastic-containing layer may comprise or may be a foamed plastic layer, to reduce the weight of the panel and/or to further increase its thermal insulation efficacy.

Due to their porosity, the porous layer of thermoplastically bonded fiber material and the foamed plastic layer of the same thickness have a lower weight per unit area than a layer of the same thickness made of solid plastic.

The outer surface of each planar envelope wall is preferably provided with at least one plastic-containing layer.

The thermally insulating planar component can also be used in conjunction with an additional planar material made of plastic, in particular LWRT material. In that case it may include a frame that contains plastic, for example, and is connected to the metal foil envelope in at least one planar extension direction of the extension plane. The frame or the additional planar plastic component preferably continues the metal foil envelope in the direction in which it is connected. The frame or the additional plastic-containing component preferably surrounds the metal foil envelope at least partially along a portion of its edge region. It is particularly preferable for the plastic-containing frame plastic to surround the metal foil envelope completely along its edge region. In this way, regions of a thermally insulating planar component may be formed from a vacuum panel or from at least a core comprising a vacuum panel and a frame that is connected to the vacuum panel.

The frame preferably contains a thermoplastically bonded fiber material, with the percentages by weight of fiber material and thermoplastic binder material in the frame being different from those in the plastic-containing layers described above, which can be arranged on the outer surface of the at least one planar envelope wall. The percentage of fiber material is preferably higher in the frame than in the plastic-containing layer applied to the outer surface of the planar envelope wall. In addition, or alternatively, the weight per unit area of the frame is preferably higher than that of one of the plastic-containing layers.

The fiber material of the frame is also preferably a tangled fiber material, or comprises disordered fibers in a stochastically distributed orientation.

If the thermally insulating planar component has a frame, the aforementioned at least one plastic-containing layer, which is arranged on the outer surface of at least one planar envelope wall, preferably extends beyond the metal foil envelope and over the frame, at least partially or completely covering the frame. The at least one plastic-containing layer is therefore also arranged on at least one outer surface, preferably on both outer surfaces of the frame. The material of the frame and the plastic-containing layer preferably include a compatible or identical plastic, which facilitates the connection of the frame to the plastic-containing layer.

Thus, both the metal foil envelope and the frame are preferably arranged between at least two plastic-containing layers.

The thermally insulating planar component can be curved, for example by press molding, about at least two curvature axes that are spaced from one another and/or that together form an angle, so that the component can be designed as a complex three-dimensional structure. The curvature axes may be parallel curvature axes, as is the case, for example, with the formation of swage lines, or the curvature axes may be oriented skewed in relation to one another. The curvature axes of the component typically result from the bending axes used in the bending processes during production of the component.

The thermally insulating planar component of the present application is preferably produced by placing a planar, flat vacuum panel semifinished product, optionally together with a plastic-containing layer, for example in the form of a fiber mat semifinished product made from thermoplastically bonded fiber material, in a press mold, closing the press mold, and applying heat. The press mold may be heated or cooled for this purpose. Temperatures above the melting or softening point of the thermoplastic binder material are preferably reached in the press mold.

The present invention further relates to the particularly advantageous use of a thermally insulating planar component, as described and refined above, as a heat insulation component in a motor vehicle, in particular as an engine compartment insulation component.

The ceramic powder inside the metal foil envelope can generally be any metal oxide. In the past, silica powder has proven effective for this purpose. However, magnesia powder and/or alumina powder may also be used.

These and other objects, aspects, features, refinements and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
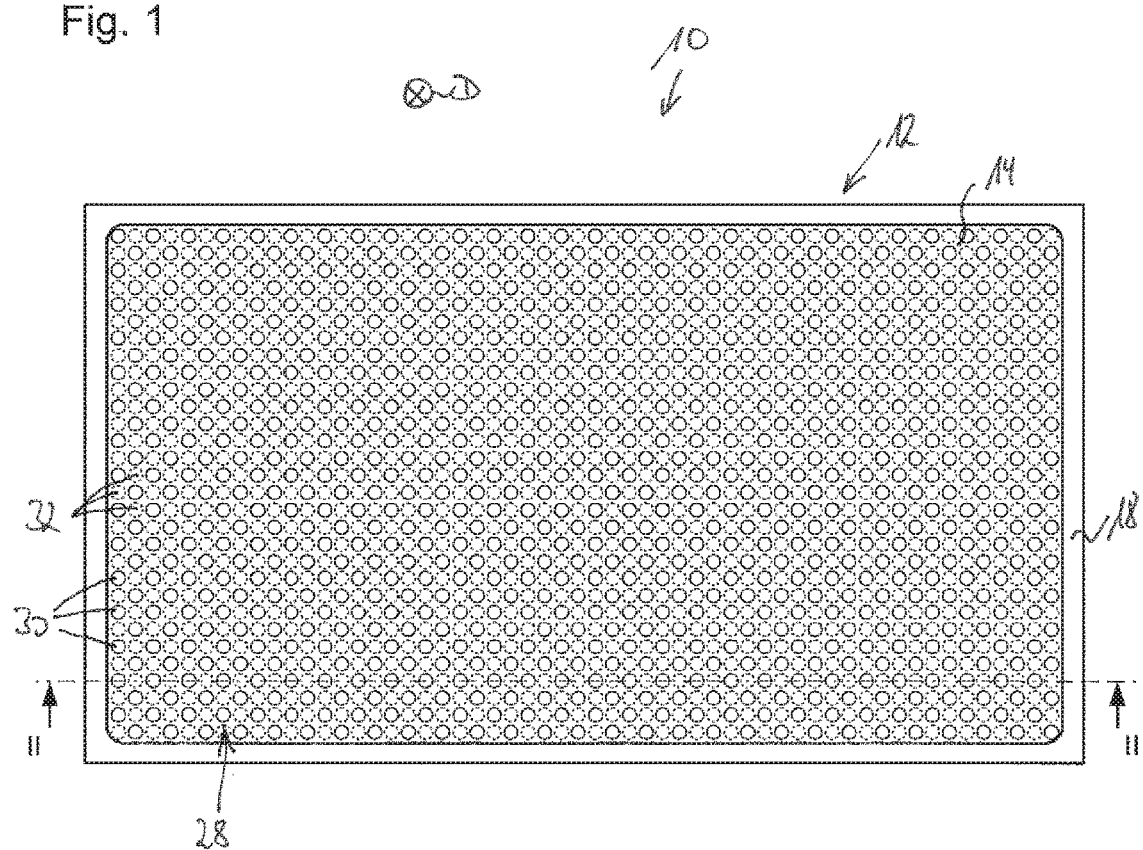
FIG. 1 is a plan view of a vacuum panel semifinished product for use in producing a thermally insulating component according to the invention.

Referring now to the drawings wherein the showings are for the purpose of illustrating preferred and alternative embodiments of the invention only and not for the purpose of limiting the same, FIG. 1 shows a flat planar vacuum panel semifinished product, shown in a plan view, that is labeled generally as 10. The extension plane of the vacuum panel semifinished product 10 of FIG. 1 is parallel to the drawing plane of FIG. 1, and the thickness direction of semifinished product 10 is orthogonal to the drawing plane of FIG. 1.

Figure 2:
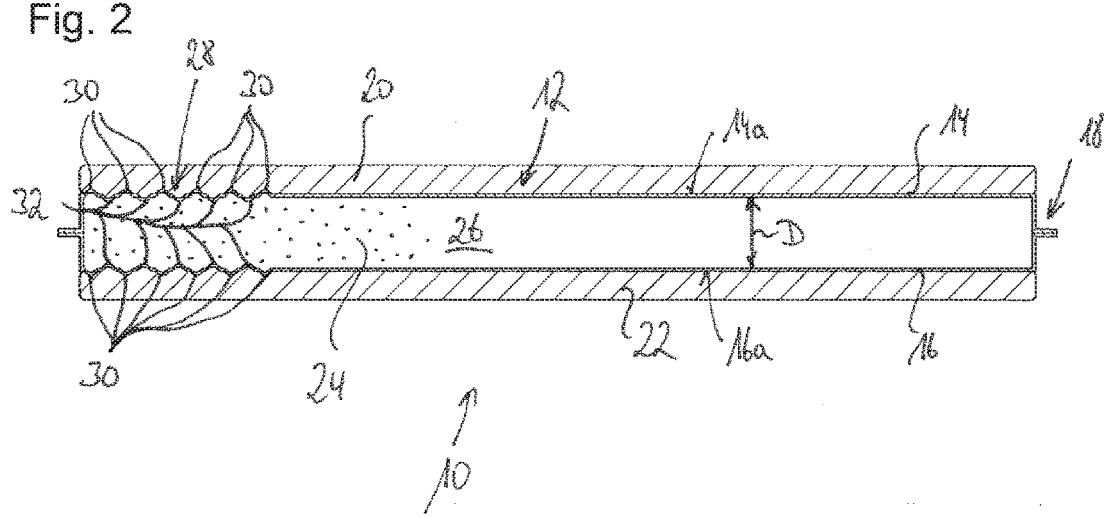
FIG. 2 is a cross-section of the vacuum panel semifinished product of FIG. 1 along cutting plane II-II, with plastic-containing layers made of thermoplastically bonded fiber material arranged on the outer surfaces

FIG. 2 shows a cross-section of semifinished product 10 of FIG. 1 in sectional plane II-II of FIG. 1, which is orthogonal to the drawing plane of FIG. 1.

Vacuum panel semifinished product 10, which is referred to in its initial, flat planar state as a "semifinished product" solely to distinguish it from its later, reshaped three-dimensional state, comprises a metal foil envelope 12, which in the example shown has two substantially parallel planar envelope walls 14 and 16, arranged spaced from one another in thickness direction D, and connected by a surrounding edge region 18. Edge region 18, which extends around the entire perimeter of planar envelope walls 14 and 16, spans the distance between planar envelope walls 14 and 16 in thickness direction D.

It should be expressly noted that FIGS. 1 and 2 are not true-to-scale drawings, but merely rough-schematic representations of vacuum panel semifinished product 10 (FIG. 1) and of semifinished product 10 enhanced with plastic-containing fiber-mat semifinished products 20 and 22 on outer surfaces 14a and 16a of planar envelope walls 14 and 16, respectively (FIG. 2).

In a manner known per se, metal foil envelope 12 is sealed along edge region 18 using an appropriate thermoplastic coating of the metal foils. The sealing seam may be formed on all four sides of vacuum panel semifinished product 10, as shown in FIG. 1, or may be formed on only three sides if metal foil envelope 12 is formed by folding a foil over. Rather than coating areas with a thermoplastic sealing material such as a polyolefin and thermally sealing the coated areas, the metal foil envelope can also be sealed by applying glue to the areas to be joined and then gluing those areas together.

The interior 24 of metal foil envelope 12 contains highly dispersed ceramic powder 26, for example silica powder, and the gas is evacuated from the interior 24 of metal foil envelope 12.

In this case, metal foil envelope 12 is made from an aluminum alloy. Aluminum alloys are preferred for producing metal foil envelope 12.

As indicated in FIGS. 1 and 2, envelope foil walls 14 and 16 are designed as having a surface structure 28 that increases their surface area. Said surface structure in each of planar envelope walls 14 and 16 comprises protrusions 30 that project away from the other planar envelope wall and, alternating with these in an orthogonal grid, indentations 32 that project toward the other planar envelope wall. In FIG. 2, only about the left 20% of planar envelope walls 14 and 16 are shown with protrusions 30 and indentations 32, for the sake of clarity.

In FIG. 1, in planar envelope wall 14, which is facing the viewer of FIG. 1, protrusions 30 projecting toward the viewer are shown as circles outlined by a solid line, and indentations 32 projecting away from the viewer are shown as circles outlined by dashed lines. A surface structure of this type is typically obtained by embossing the metal foil. The embossing process increases the surface area of metal foil wall 14 as compared with a smooth surface structure. This is easy to understand, because in order for planar envelope wall 14 to cover the same area, more metal foil material is needed for the formation of planar envelope wall 14 with an embossed foil than with a smooth foil.

The embossing or generally the surface area-increasing surface structure 28 of planar envelope walls 14 and 16 provides a "deformation reserve" for planar envelope walls 14 and 16, which enables vacuum panel semifinished product 10 to be deformed by bending around bending axes, without exceeding the failure limits of the metal foils of planar envelope walls 14 and 16 due to tensile stress caused by the bending of semifinished product 10.

In FIG. 2, fiber mat semifinished products 20 and 22 are arranged on outer surfaces 14a and 16a, respectively, each fiber mat being connected to the respectively associated planar envelope wall 14 or 16, with a known adhesion promoter and a thermoplastic sealing layer bonded by means of the adhesion promoter located therebetween. The adhesion promoter and the sealing layer are not shown in FIG. 2.

Fiber mat semifinished products 20 and 22 are porous tangled glass fiber mats bonded by polypropylene, for example.

Figure 3:
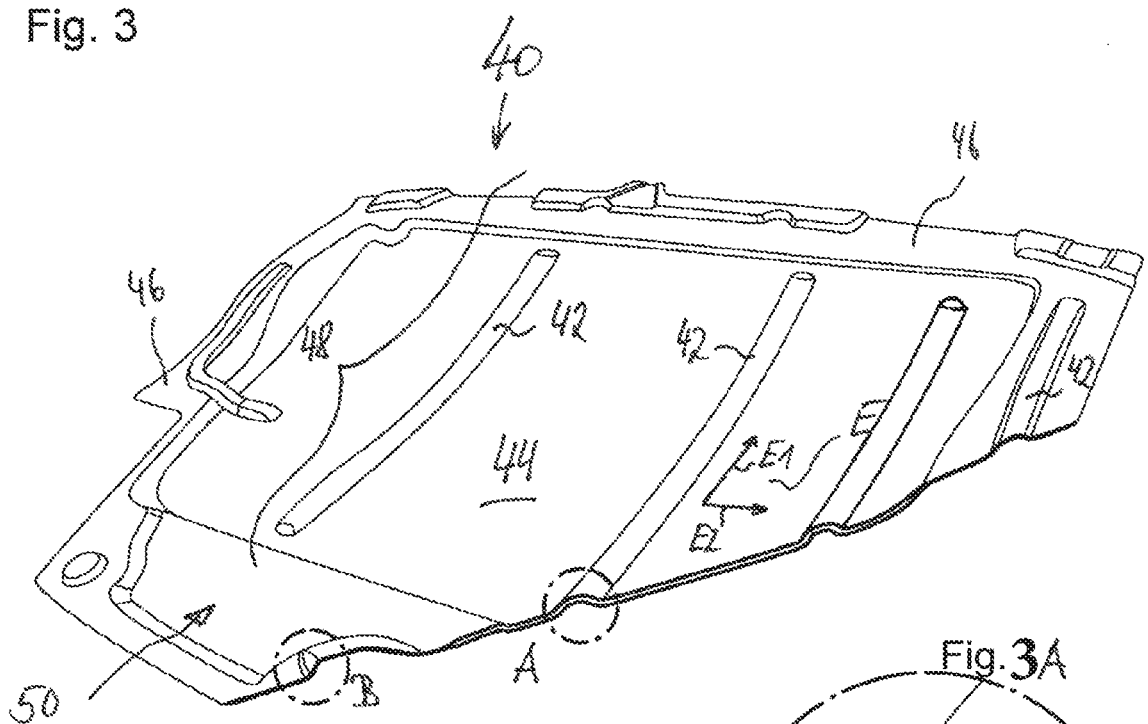
FIG. 3 is a perspective, partially sectional view of a thermally insulating planar component of the present invention, produced using the semifinished product of FIG. 2, in the form of an insulating component for insulating a functional space of a motor vehicle
Figure 3B:
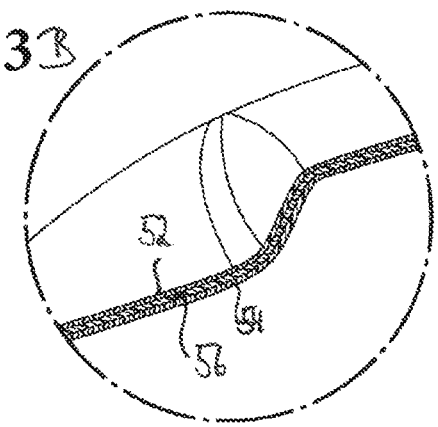
FIG. 3A is an enlarged cross-sectional view of a region of the partially sectioned portion of FIG. 3; and, FIG. 3B is an enlarged cross-sectional view of another region of the partially sectioned portion of FIG. 3.
Figure 3A:
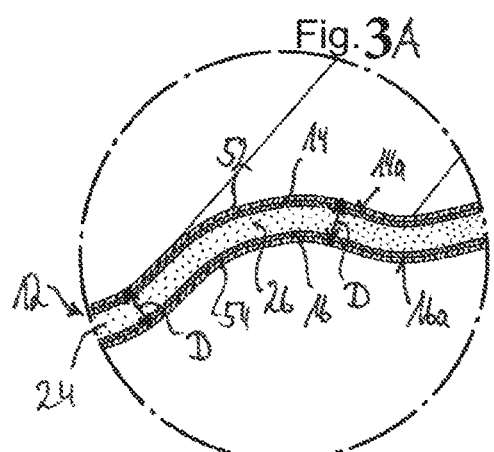

FIG. 3 shows a partially sectional view of a thermally insulating planar component 40 that has been produced from vacuum panel semifinished product 10, shown here only schematically, with fiber mat semifinished products 20 and 22 arranged on outer surfaces 14a and 16a of its planar envelope walls 14 and 16, respectively.

The component extends in an extension plane E which is curved at multiple points, with the linearly independent planar extension directions E1 and E2 thereof, as well as the thickness direction D orthogonal thereto, pointing locally in different directions depending upon the location of each in component 40—as viewed in an absolute coordinate system. Planar extension directions E1 and E2 span an osculating plane of the component at each point on component 40.

To produce component 40, vacuum panel semifinished product 10, with fiber material semifinished products 20 and 22 arranged thereon, was placed in a press mold and, with the application of heat and compacting pressure, was molded into the shape of the mold cavity provided by the press molding tool, to form the component 40 shown in a partially sectional view in FIG. 3. This production method can specifically comprise, for example, heating vacuum panel semifinished product 10 in a heating device, for example a panel heater or infrared heater, beyond the melting point of the thermoplastic binder material contained in fiber material semifinished products 20 and 22, and subsequently molding and cooling it a molding press. The cooled component can then be removed from the press mold without undergoing deformation by the demolding forces.

The component is equipped with swage lines 42, for example, and has a curved base region 44. Three-dimensionally shaped edge formations 46 are likewise provided, which can be used for mounting component 40 on a component support. Component 40 is an insulation component for insulating functional spaces in a motor vehicle, for example as part of an engine compartment lining.

One region 48 of component 40 has been formed by reshaping vacuum panel semifinished product 10 of FIG. 1. Adjoining region 48 is a frame 50, which is made exclusively of thermoplastically bonded fiber materials. The semifinished product that forms frame 50 has been molded together with vacuum panel 10 of FIGS. 1 and 2 in the aforementioned press mold.

An enlarged area 3A of FIG. 3 shows a cross-section of region 48, in a sector in which a swage line 42 is formed. The enlargement 3A shows a core, which is central in thickness direction D, along with highly dispersed ceramic powder 26, encased between planar envelope walls 14 and 16 in an evacuated atmosphere. On outer surfaces 14a and 16a of planar envelope walls 14 and 16, respectively, outer layers made of thermoplastically bonded tangled glass fibers are formed, which are produced by compacting fiber material semifinished products 20 and 22. The porous outer layers are labeled with reference signs 52 and 54. Due to the compacting in the molding step, they are more densely packed than the fiber material semifinished products 20 and 22 from which they originate.

In the area of frame 50, the enlarged section 3B shows a frame 50 made exclusively of thermoplastically bonded fiber material layers, specifically a porous LWRT core layer 56 that extends between outer layers 52 and 54. Outer layers 52 and 54 continue to extend over LWRT core layer 56, holding it between them, in the extension plane of component 40 beyond the vacuum panel.

The percentage by weight of reinforcing fibers is preferably greater in LWRT core layer 56 than in outer layers 52 and 54. For that reason, the percentage of thermoplastic binder is preferably lower. Core layer 56 also generally has a higher weight per unit area than either of outer layers 52 and 54.

In contrast to the illustration of FIG. 3, frame 50 can completely surround and seal off the vacuum panel with its filling of highly dispersed ceramic powder 26.

The invention described herein enables thermally insulating planar components to be formed even in complex shapes, for example contoured envelope components for lining functional spaces in a motor vehicle, in particular for lining the engine compartment, with low thermal conductivity levels and thus high thermal conductivity resistances, and with narrow wall thicknesses of less than 5 mm. This allows the installation space available in motor vehicles to be utilized more efficiently than with thermally insulating planar component materials of the prior art.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A thermally insulating planar component that extends in an extension plane and has a structural thickness orthogonal to the extension plane, the dimensions of the component in the extension plane being many times greater than its thickness measurement orthogonal to the extension plane, with the component comprising a vacuum panel having an air-tight, evacuated metal foil envelope that is filled with a highly dispersed ceramic powder, the metal foil envelope having two planar envelope walls arranged spaced from one another in the thickness direction and connected to one another by an edge region that spans the distance between the planar envelope walls in the thickness direction, and each planar envelope wall having an inner surface that faces the other planar envelope wall and the highly dispersed ceramic powder and an outer surface that faces away from the other planar envelope wall and the highly dispersed ceramic powder, at least one of the planar envelope walls is designed in at least one deformation section as having a surface structure that increases the surface area of the planar envelope wall over that of a smooth surface structure, the component being curveable about at least one curvature axis in the area of the deformation section, wherein at least one layer containing plastic is provided on the outer surface of at least one of the planar envelope walls, wherein the plastic-containing layer comprises or is a porous layer of thermoplastically bonded fiber material.

2. The thermally insulating planar component according to claim 1, wherein the component is curved about the at least one curvature axis in the area of the deformation section such that the planar envelope wall is convex on its outer surface in the deformation section.

3. The thermally insulating planar component according to claim 2, wherein the planar component is curved about at least two curvature axes that are at least one of spaced from one another and together form an angle.

4. The thermally insulating planar component according to claim 1, wherein the highly dispersed ceramic powder includes at least one of a metal oxide powder, a silica powder, a magnesia powder and an alumina powder.

5. The thermally insulating planar component according to claim 1, wherein the at least one deformation section of one planar envelope wall and the at least one deformation section of the respectively other planar envelope wall at least partially face one another in the thickness direction.

6. The thermally insulating planar component according to claim 1, wherein the plastic-containing layer comprises or is a solid plastic layer.

7. The thermally insulating planar component according to claim 1, wherein the plastic-containing layer comprises or is a foamed plastic layer.

8. The thermally insulating planar component according to claim 1, further including a frame that contains plastic, which is connected to the metal foil envelope in at least one extension direction of the extension plane.

9. The thermally insulating planar component according to claim 8, wherein the frame at least partially surrounding the metal foil envelope along a portion of its edge region.

10. The thermally insulating planar component according to claim 8, wherein at least one plastic-containing layer is provided on the outer surface of at least one of the planar envelope walls, the at least one plastic-containing layer extends beyond the metal foil envelope and over the frame.

11. The thermally insulating planar component according to claim 10, wherein the metal foil envelope and the frame are arranged between at least two plastic-containing layers.

12. The thermally insulating planar component according to claim 1, wherein the at least one of indentations extending toward the other planar envelope wall and protrusions extending away from the other planar envelope wall includes at least one indentations extending toward the other planar envelope wall and at least one protrusions extending away from the other planar envelope wall.

13. The thermally insulating planar component according to claim 12, wherein the cup-shaped embossments are spherical cup-shaped indentations and protrusions.

14. The thermally insulating planar component according to claim 13, wherein the spherical cup-shaped indentations and protrusions that alternate with one another in two mutually orthogonal planar directions of the extension plane.

15. The thermally insulating planar component according to claim 1, wherein each of the two planar envelope walls has at least one deformation section which has a surface structure that increases the surface area of the respective planar envelope wall over that of a smooth surface structure.

16. The thermally insulating planar component according to claim 15, wherein the at least one deformation section of the each planar envelope wall, in contrast to a smooth surface structure of the each planar wall, includes at least one of indentations extending toward the other planar envelope wall and protrusions extending away from the other planar envelope wall.

17. The thermally insulating planar component according to claim 16, wherein at least one of the indentations and the protrusions are arranged in a regular pattern.

18. A thermally insulating planar component that extends in an extension plane and has a structural thickness orthogonal to the extension plane, the dimensions of the component in the extension plane being many times greater than its thickness measurement orthogonal to the extension plane, with the component comprising a vacuum panel having an air-tight, evacuated metal foil envelope that is filled with a highly dispersed ceramic powder, the metal foil envelope having two planar envelope walls arranged spaced from one another in the thickness direction and connected to one another by an edge region that spans the distance between the planar envelope walls in the thickness direction, and each planar envelope wall having an inner surface that faces the other planar envelope wall and the highly dispersed ceramic powder and an outer surface that faces away from the other planar envelope wall and the highly dispersed ceramic powder, at least one of the planar envelope walls is designed in at least one deformation section as having a surface structure that increases the surface area of the planar envelope wall over that of a smooth surface structure, the component being curveable about at least one curvature axis in the area of the deformation section, the thermally insulating planar component further including a frame that contains plastic, which is connected to the metal foil envelope in at least one extension direction of the extension plane, and wherein the frame comprises or is a thermoplastically bonded fiber material.

* * * * *